Aug. 17, 1937. J. B. HOWER 2,090,125
NUT
Filed May 25, 1937
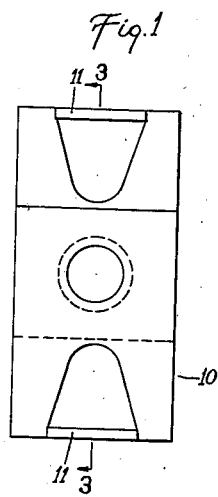
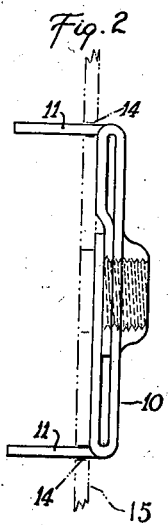
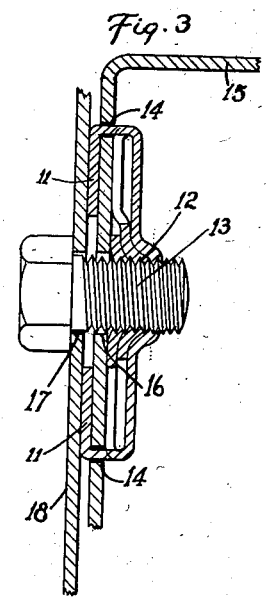
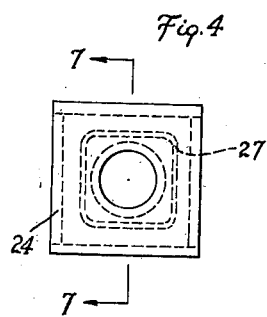
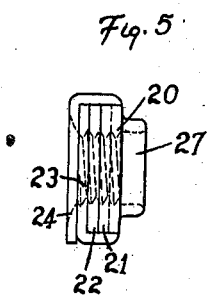
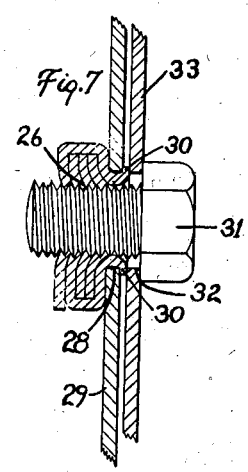
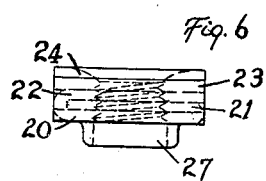
Inventor
JOHN B. HOWER
By Ralph Barrow
Attorney Patented Aug. 17, 1937

2,090,125

UNITED STATES PATENT OFFICE 2,090,125

NUT

John B. Hower, Akron, Ohio, assignor to Akron Selle Company, Akron, Ohio, a corporation of Ohio Application May 25, 1937, Serial No. 144,676

8 Claims. (Cl. 85—32)

This invention relates to nuts and particularly to nuts such as are used in the fabrication or assembly of constructions such as automobile body constructions, wherein the nut is first fixed in one part in association with a screw or bolt aperture ready for reception of a screw or bolt extended through another part during assembly operations.

Heretofore it has been the general practice in automobile and like manufacture to provide a standard nut and to provide a separate part for embracing and holding the nut, which separate part is attached to a member of the automobile or other construction in association with a screw or bolt hole whereby a screw or bolt may be later threaded into the nut to secure two or more parts together.

It is the purpose of the present invention to provide a single-piece nut construction with means for attaching it to a part of a construction in association with a screw or bolt hole which will be of simple economical construction, which will eliminate the use of a standard nut, and will provide a more secure screw or bolt connection between parts of a construction.

The foregoing and other purposes of the invention are attained in the nut-formations illustrated in the accompanying drawing and described below. It is to be understood that the invention is not limited to the specific forms thereof shown and described.

Of the accompanying drawing:

Figure 1 is a front elevation of a nut-formation embodying the invention.

Figure 2 is a side-elevation thereof.

Figure 3 is a section on line 3—3 of Figure 1 showing the nut in place in one part of a structure or fabrication and showing another part of said structure secured thereto by a bolt engaged with said nut-formation.

Figure 4 is a rear elevation of another form of the invention.

Figure 5 is one side elevation thereof,

Figure 6 is another side elevation thereof, and

Figure 7 is a section on line 7—7 of Figure 4, showing the nut in place in one part of a construction and showing another part of the construction secured by a bolt engaged with said nut.

Referring to Figures 1 to 3 of the drawing, the numeral 10 designates a strip of sheet metal which has its free end portions punched out to provide clinching tabs 11, 11 which are bent outwardly perpendicularly of the strip, said free end portions otherwise being folded over upon the central portion of the strip into overlapping relation at its center (see Figures 2 and 3). This provides three layers of metal at the center of the strip which, as best shown in Figure 3, are punched and preferably extruded, as shown, to provide a screw or bolt aperture 12. The extruding of the metal provides a thickness to give the effect of the required standard nut. The aperture 12 is tapped to receive a screw or bolt such as the bolt 13.

The form of the invention shown in Figures 1 and 2 may be used as indicated in Figure 3, the tabs 11 being inserted through openings 14, 14 in a part 15 to position the improved nut-formation in relation to a bolt or screw aperture 16 in part 15, the tabs 11 being bent over as shown to clench the nut-formation in place. The bolt 13 or a screw may then be inserted through an aperture 17 in a part 18 through the opening 16 in part 15 and threaded into the nut-formation to secure parts 15 and 18 together. Tightening of the bolt 13, or a screw, in the improved nut-formation causes some deformations and shifting of the several laminations of metal forming the nut and causes the nut to be self-locking on the bolt or screw to resist loosening of the bolt or screw.

Referring to Figures 4 to 7, the invention may be embodied in a nut-formation comprising a central portion 20 from which extend two or more flaps 21, 22, 23, 24 (four being shown) which are folded inwardly and lapped over the central portion 20 to provide a nut body, the central piece 20 and the overlapping flaps 21, 22, 23, and 24 being punched and extruded and tapped as indicated at 26 and the central portion 20 provided with a lip 27 which may be of square or other non-circular shape, as shown, whereby it may be engaged in a similarly shaped aperture 28 in a part 29 and peened over as indicated at 30 to clench the nut to part 29 whereby a bolt 31 or screw may be extended through an aperture 32 in a part 33 and threaded into the nut-formation to secure part 33 to part 29. The laminations in the nut-formation of Figures 4 to 7 also will shift and deform to some extent to provide a self-locking action by the nut on the bolt or screw.

Modifications of the invention other than those disclosed herein may be resorted to without departing from the spirit thereof or the scope of the appended claims.

What is claimed is:

1. A nut-formation comprising a piece of sheet-metal having free end portions folded over the central portion of the piece to overlapping relation with the central portion and with each other to provide a plurality of laminations of sheet metal centrally of the piece, said laminations being punched and extruded and tapped to receive a bolt or screw, and means for securing said nut-formation in association with a bolt or screw aperture in a part of a construction or fabrication.

2. A nut-formation comprising a piece of sheet-metal having free end portions folded over the central portion of the piece to overlapping relation with the central portion and with each other to provide a plurality of laminations of sheet metal centrally of the piece, said laminations being punched and tapped to receive a bolt or screw, and means for securing said nut-formation in association with a bolt or screw aperture in a part of a construction or fabrication.

3. A nut-formation comprising a piece of sheet-metal having free end portions folded over the central portion of the piece to overlapping relation, to provide a plurality of laminations of sheet metal centrally of the piece, said laminations being punched and extruded and tapped to receive a bolt or screw, and means for securing said nut-formation in association with a bolt or screw aperture in a part of a construction or fabrication, said means comprising tabs punched out of said free end portions and bent perpendicularly of the piece so that they may be extended through openings in said part and bent to clench the nut-formation to said part.

4. A nut-formation comprising a piece of sheet-metal having end portions folded over the central portion of the piece to overlapping relation, to provide a plurality of laminations of sheet metal centrally of the piece, said laminations being punched and tapped to receive a bolt or screw, and means for securing said nut-formation in association with a bolt or screw aperture in a part of a construction or fabrication, said means comprising tabs punched out of said free end portions and bent perpendicularly of the piece so that they may be extended through openings in said part and bent to clench the nut-formation to said part.

5. A nut-formation comprising a piece of sheet-metal having free end portions folded over the central portion of the piece to overlapping relation, to provide a plurality of laminations of sheet metal centrally of the piece, said laminations being punched and extruded and tapped to receive a bolt or screw, and means for securing said nut-formation in association with a bolt or screw aperture in a part of a construction or fabrication, said means comprising a non-circular lip on said piece about the punched and tapped opening formed to fit into a correspondingly formed opening in said part and to be bent about the edge of said opening to secure the nut formation to said part.

6. A nut-formation comprising a piece of sheet-metal having free end portions folded over the central portion of the piece to overlapping relation to provide a plurality of laminations centrally of the piece, said laminations being punched and tapped to receive a bolt or screw, and means for securing said nut-formation in association with a bolt or screw aperture in a part of a construction or fabrication, said means comprising a non-circular lip on said piece about the punched and tapped opening formed to fit into a correspondingly formed opening in said part and to be bent about the edge of said opening to secure the nut-formation to said part.

7. A nut-formation comprising a piece of sheet-metal having a central portion, and two or more end portions folded over onto the central portion in lapped relationship, said central portion and said overlapping end portions being punched and extruded and tapped and means for securing said nut-formation to a part of a construction or fabrication in association with a bolt or screw aperture in said part, said means comprising a non-circular lip on said piece about the punched and tapped opening formed to fit into a correspondingly formed opening in said part and to be bent about the edge of said opening to secure the nut-formation to said part.

8. A nut-formation comprising a piece of sheet-metal having a central portion, and two or more end portions folded over onto the central portion in lapped relationship, said central portion and said overlapping end portions being punched and tapped and means for securing said nut-formation to a part of a construction or fabrication in association with a bolt or screw aperture in said part, said means comprising a non-circular lip on said piece about the punched and tapped opening formed to fit into a correspondingly formed opening in said part and to be bent about the edge of said opening to secure the nut formation to said part.

JOHN B. HOWER.